(12) United States Patent
Schmidt

(10) Patent No.: US 9,956,652 B2
(45) Date of Patent: May 1, 2018

(54) METHOD FOR THE PRODUCTION OF A ROTOR AND ROTOR

(75) Inventor: Robert Schmidt, Karlsfeld (DE)

(73) Assignee: MTU Aero Engines GmbH, Munich (DE)

( * ) Notice: Subject to any disclaimer, the term of this patent is extended or adjusted under 35 U.S.C. 154(b) by 2147 days.

(21) Appl. No.: 12/998,250

(22) PCT Filed: Oct. 7, 2009

(86) PCT No.: PCT/DE2009/001388
§ 371 (c)(1),
(2), (4) Date: Mar. 30, 2011

(87) PCT Pub. No.: WO2010/040340
PCT Pub. Date: Apr. 15, 2010

(65) Prior Publication Data
US 2011/0176922 A1   Jul. 21, 2011

(30) Foreign Application Priority Data

Oct. 9, 2008 (DE) ........................ 10 2008 051 934

(51) Int. Cl.
*F04D 29/34* (2006.01)
*B21D 53/78* (2006.01)
(Continued)

(52) U.S. Cl.
CPC ........ *B23P 15/006* (2013.01); *B23K 15/0053* (2013.01); *B23K 15/0093* (2013.01);
(Continued)

(58) Field of Classification Search
CPC .......... B23K 2201/001; B23K 15/0053; B23K 15/0093; B23K 37/0435; B23K 26/24;
(Continued)

(56) References Cited

U.S. PATENT DOCUMENTS 2,450,493 A   10/1948   Strub
2,831,958 A   12/1955   Richardson
(Continued)

FOREIGN PATENT DOCUMENTS

CN   1012545578   9/2008
DE   695 00 234 T2   8/1997
(Continued)

*Primary Examiner* — Dana Ross
*Assistant Examiner* — James Sims, III
(74) *Attorney, Agent, or Firm* — Davidson, Davidson & Kappel, LLC

(57) ABSTRACT

A method for producing a rotor, particularly a turbine disk or a turbine ring for a turbine stage of a turbomachine, wherein at least the following steps are carried out: producing a blade ring (14) including a plurality of rotor blades (12), welding adapters (22) together which are disposed in the region of blade footings of the rotor blades (12), wherein at least substantially radial weld seams (30*a*) having predetermined welding depths are generated, disposing a rotor disk (32) or a rotor ring on the blade ring (14), and welding the rotor disk (32) or the rotor ring to the adapters (22) of the rotor blades (12), wherein at least one further weld seam (30*b*) is generated. A rotor, particularly a turbine disk or a turbine ring for a turbine stage of a turbomachine is also disclosed.

13 Claims, 3 Drawing Sheets

(51) Int. Cl.
*B23P 15/00* (2006.01)
*B23K 15/00* (2006.01)
*B23K 37/04* (2006.01)
*B23P 6/00* (2006.01)
*F01D 5/22* (2006.01)
*F01D 5/30* (2006.01)
*F01D 5/34* (2006.01)
*F01D 9/04* (2006.01)
*B23K 101/00* (2006.01)

(52) U.S. Cl.
CPC .......... *B23K 37/0435* (2013.01); *B23P 6/005* (2013.01); *F01D 5/22* (2013.01); *F01D 5/3061* (2013.01); *F01D 5/34* (2013.01); *F01D 9/044* (2013.01); *B23K 2201/001* (2013.01); *Y10T 29/49316* (2015.01)

(58) Field of Classification Search
CPC ........ B23K 26/28; B23P 15/006; B23P 6/005; F01D 5/22; F01D 5/3061; F01D 5/34; F01D 9/044
USPC ..... 29/889.2, 889.21, 889.7, 889.71, 889.72; 416/213 R; 219/121.64
See application file for complete search history.

(56) References Cited

U.S. PATENT DOCUMENTS

| | | |
|---|---|---|
| 3,246,389 A | 4/1966 | Pfau |
| 3,617,685 A * | 11/1971 | Brill-Edwards et al. ................ 219/121.14 |
| 4,034,182 A | 7/1977 | Schlosser et al. |
| 4,812,107 A | 3/1989 | Barcella et al. |
| 5,383,593 A | 1/1995 | Lechervy et al. |
| 5,551,623 A | 9/1996 | Collot et al. |
| 6,568,077 B1 * | 5/2003 | Hellemann et al. ......... 29/889.1 |
| 7,900,351 B2 * | 3/2011 | Koehler et al. ............ 29/889.21 |
| 2005/0249599 A1 * | 11/2005 | Hemsley et al. ......... 416/204 R |
| 2008/0170939 A1 | 7/2008 | Palmer et al. |
| 2010/0284817 A1 | 11/2010 | Bamberg et al. |

FOREIGN PATENT DOCUMENTS

| | | |
|---|---|---|
| DE | 693 11 676 T2 | 11/1997 |
| DE | 103 40 823 A1 | 3/2005 |
| EP | 0197268 A | 10/1986 |
| GB | 6 14 547 A | 12/1948 |
| WO | WO 2009/049596 A | 4/2009 |

* cited by examiner

METHOD FOR THE PRODUCTION OF A ROTOR AND ROTOR

The invention relates to a method for the production of a rotor, especially a turbine disk or a turbine ring for a turbine stage of a continuous-flow machine. The invention also relates to a rotor, especially to a turbine disk or a turbine ring for a turbine stage of a continuous-flow machine, comprising a plurality of rotor blades that are arranged in the form of a blade ring and that are joined, at least indirectly, to a rotor disk or to a rotor ring.

BACKGROUND

Such rotors are known in the state of the art and they normally comprise a plurality of rotor blades that are arranged in the form of a blade ring and that are joined, at least indirectly, to a rotor disk or to a rotor ring. For this reason, the rotor can be configured, for instance, as a turbine disk (blisk) or turbine ring (bling) for a continuous-flow machine.

A major problem during the installation or repair of such a rotor, however, is that when the individual rotor blades are joined, welding flaws and pore formation can occur due to impurities stemming from cooling lubricants (dry), which gives rise to considerable extra costs. Working without cooling lubricants, however, is very problematic with the commonly employed materials such as, for example, Inconel 718.

SUMMARY OF THE INVENTION

It is an object of the present invention to provide a rotor of the above-mentioned type that can be produced or repaired more cost-efficiently and more reliably.

The present invention provides a method for the production of a rotor as well as by a rotor.

In a method according to the invention for the production of a rotor, especially of a turbine disk or of a turbine ring for a turbine stage of a continuous-flow machine, at least the following steps are carried out: producing a blade ring comprising a plurality of rotor blades, welding together adapters arranged in the area of the roots of the rotor blades, whereby at least essentially radial weld seams that have predefined welding depths are created, positioning a rotor disk or a rotor ring on the blade ring, and welding the rotor disk or the rotor ring to the adapters of the rotor blades, whereby at least one additional weld seam is created. In other words, the adapters are first tack-welded by means of essentially radial weld seams and subsequently welded to the rotor disk or to the rotor ring. Therefore, the at least one additional weld seam does not come into contact with any impurities that might be present. This reliably prevents any impurities that might be present, such as cooling lubricants and the like, from causing unwanted welding flaws due to decomposition or outgassing, so that all in all, the rotor can be produced more quickly, more cost-efficiently and more reliably. The same applies in the case of a repair of the rotor.

In an advantageous embodiment of the invention, it is provided that the rotor blades are arranged in a prescribed installation position of the blade ring in order to produce the latter. As a result, the blade ring can be produced with the desired precision and concentricity.

Additional advantages are obtained in that the rotor blades are first detachably secured to a holding device and subsequently arranged in the prescribed installation position of the blade ring by moving the holding device. The use of a holding device translates into an improved protection of the rotor blades against inadvertent damage, scratches and the like since no direct force is applied onto the rotor blades during their placement.

In another embodiment of the invention, it is provided for the rotor disk or the rotor ring to be welded to the adapters in such a way that the at least one additional weld seam runs essentially axially and/or circularly relative to the axis of rotation of the rotor and/or along a contact area between the adapters and the rotor disk or the rotor ring. This allows a particularly reliable and mechanically sturdy connection between the blade ring and the rotor disk or the rotor ring.

In another advantageous embodiment of the invention, it is provided that the welding depths of the radial weld seams are selected in such a way that they amount to at least 50% and preferably at least 60% of the top surface width of the at least one additional weld seam. This results in a very high level of mechanical stability for the rotor.

Additional advantages are achieved when the radial weld seams are made with welding depths between 3 mm and 10 mm, especially between 5 mm and 6 mm. By creating a deeper weld than necessary, it is especially reliably prevented that any cooling lubricant that might be present can penetrate into any remaining gaps during a subsequent processing step.

In another advantageous embodiment of the invention, it is provided that the radial weld seams are over-welded with the at least one additional weld seam. This also prevents the outgassing of any impurities that might be present in the remaining gap between the adapters and the rotor disk or the rotor.

Establishing a pre-twist in the rotor blades before the blade ring is formed and/or after the radial weld seams are created reliably prevents the rotor blades from striking against each when the rotor is started up later on, for example, in a turbine.

Here, it can be advantageous for the wedge thickness of the adapters to be selected in such a way that the pre-twist is established through shrinkage after the radial weld seams have been created. This constitutes a structurally simple and cost-effective way to establish the desired pre-twist in all of the rotor blades. Moreover, the individual rotor blades do not have to be clamped separately into an appropriate holding device, which additionally makes the production or repair of the rotor cheaper and faster.

In another advantageous embodiment of the invention, it is provided for the rotor blades to be twisted by an angle between 0.5° and 5°, especially between 1° and 3°, in order to reliably prevent them from striking each other during the operation of the rotor later on.

In another embodiment of the invention, the radial weld seams are created so as to be uniformly distributed along the inner circumference of the blade ring, with the result that the rotor acquires a very high level of mechanical strength.

In this context, it can be advantageous that an electron-beam welding method and/or a laser-beam welding method is employed for the welding. With this approach, the weld seams can be made in a fast automated process with high precision, thus further lowering the production costs of the rotor.

Another aspect of the invention relates to a rotor that can be manufactured or repaired more cost-efficiently and more reliably in that adapters are arranged in the area of the roots of the rotor blades, these adapters are welded together by means of weld seams that run at least essentially radially and that have predefined welding depths, and they are welded to the rotor disk or to the rotor ring by means of another weld seam. As a result, the rotor has particularly high-grade weld seams since the occurrence of welding flaws as well as the formation of pores and the like are reliably prevented. Other advantages resulting from this can be gleaned from the preceding description.

In an advantageous embodiment of the invention, it is provided that the welding depths of the radial weld seams are selected in such a way that they amount to at least 50% and preferably at least 60% of the top surface width of the at least one additional weld seam. This results in a very high level of mechanical stability for the rotor.

Additional advantages are achieved when the radial weld seams are made with welding depths between 3 mm and 10 mm, especially between 5 mm and 6 mm. By creating a deeper weld than necessary, it is especially reliably prevented that any cooling lubricant that might be present can penetrate into any remaining gaps during a subsequent processing step.

If the rotor blades are pre-twisted and/or twisted by an angle between 0.5° and 5°, especially between 1° and 3°, they can be reliably prevented from striking each other during the operation of the rotor later on.

BRIEF DESCRIPTION OF THE DRAWINGS

Additional advantages, features and details of the invention can be gleaned from the description below of embodiments as well as from the drawings in which the same or functionally identical elements are designated by the same reference numerals. The following is shown.

DETAILED DESCRIPTION

Figure 1:
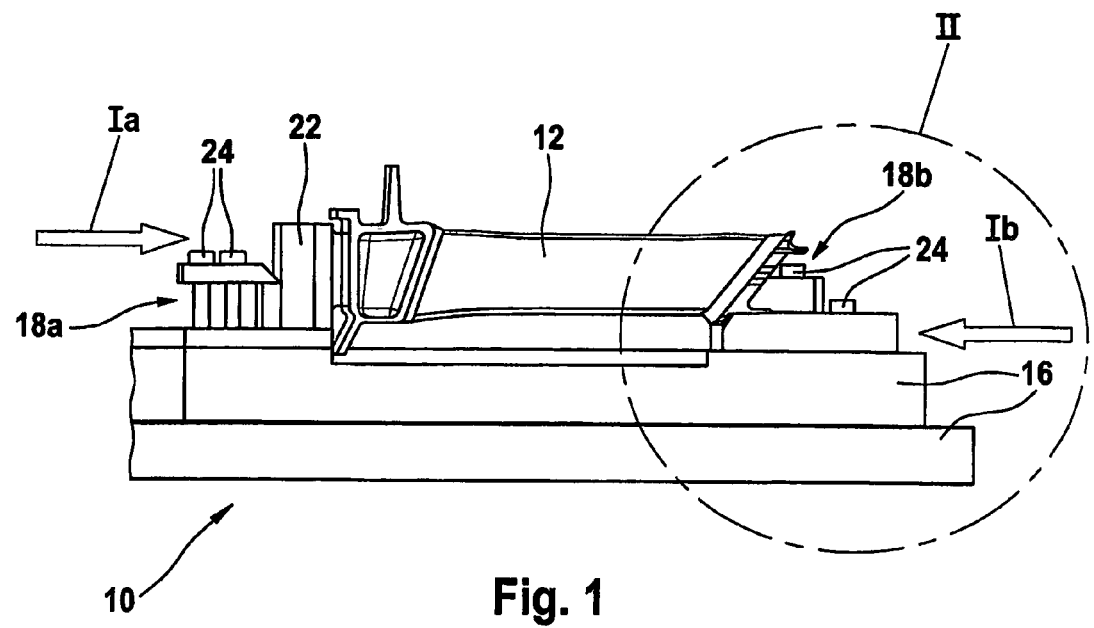
FIG. 1—a schematic side view of an embodiment of a holding device to which a rotor blade has been secured.
Figure 2:
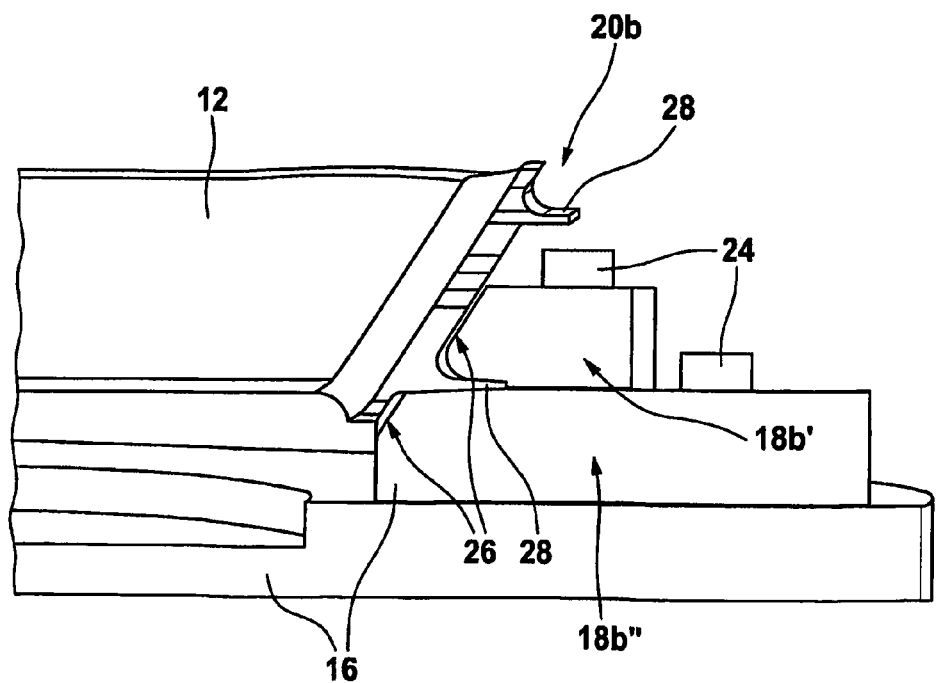
FIG. 2—an enlarged view of the detail II shown in FIG. 1.

FIG. 1 shows a schematic side view of an embodiment of a holding device 10 to which a rotor blade 12 for a blade ring 14 (see FIG. 3) of a rotor has been secured. FIG. 1 will be explained below in conjunction with FIG. 2, which shows an enlarged view of the detail II depicted in FIG. 1. The holding device 10 encompasses a base 16 and two holding elements 18a, 18b arranged on the base 16 by means of which the rotor blade 12 is detachably secured and clamped on the base 16. The holding element 18a here is configured on the rotor blade 12 as a clamping shoe and corresponds to the profile of an adapter 22, while the holding element 18b is configured so as to correspond to an outer cover strip profile 20b (Z profile) of the rotor blade 12, so that a positive fit is achieved in certain areas. Moreover, the holding element 18b comprises two partial holding elements 18b', 18b", whereby the partial holding element 18b' is also configured as a clamping shoe. An adapter 22, whose function will be explained in greater detail below, is arranged on the root of the rotor blade 12. The holding elements 18a, 18b, in turn, are detachably attached to the base 16 by fastening means 24 configured as screws. The holding elements 18a, 18b are also provided with a protective layer 26 in the area where they make contact with the rotor blade 12 in order to reliably prevent the rotor blades 12 from being scratched or the like.

In order to secure the rotor blade 12 to the holding device 10, the partial holding element 18b' configured as a clamping shoe is preferably first secured with a positive fit to a sealing fin 28 (fin sealing lip, sealing web) provided on the outer cover strip profile 20b of the rotor blade 12. Subsequently, the rotor blade 12 is positioned against the holding device 10 and secured by screwing on the partial holding elements 18b', 18b". Then the rotor blade 12 is clamped by means of the holding element 18a arranged on and screwed onto the adapter 22. The rotor blade 12 can be readjusted in the radial direction of the blade ring 14—for instance, by means of gentle tapping—so as to ensure its concentricity in accordance with the arrows Ia, Ib via the adapter 22 or the holding elements 18a, 18b. Since no direct force is applied onto the secured rotor blade 12, the latter is moved via the holding device 10, thereby reliably preventing it from slipping or being damaged, and also preventing a functional layer that might be present on the rotor blade 12 from chipping off. In this context, it can be provided that the rotor blades 12 are arranged on a suitably configured mounting apparatus (not shown) for purposes of assembling the entire blade ring 14, after which the holding device 10 or its base 16 can be moved along a corresponding sliding guide of the mounting apparatus.

In the present embodiment, the holding elements 18a, 18b are configured in such a way that, when the rotor blade 12 is secured to the base 16, a pre-twist is established in the rotor blade 12 in that the rotor blade is twisted by an angle between 0.5° and 5°, for instance, between 1° and 3°. Here, it is provided that the holding elements 18a, 18b are geometrically designed in such a way that the pre-twist is established when the rotor blade 12 is secured to the base 16. Therefore, replacing or varying the holding elements 18a, 18b allows the desired pre-twist to be established so as to be variable as a function of the specific structural requirements made of the blade ring 14.

Figure 3:
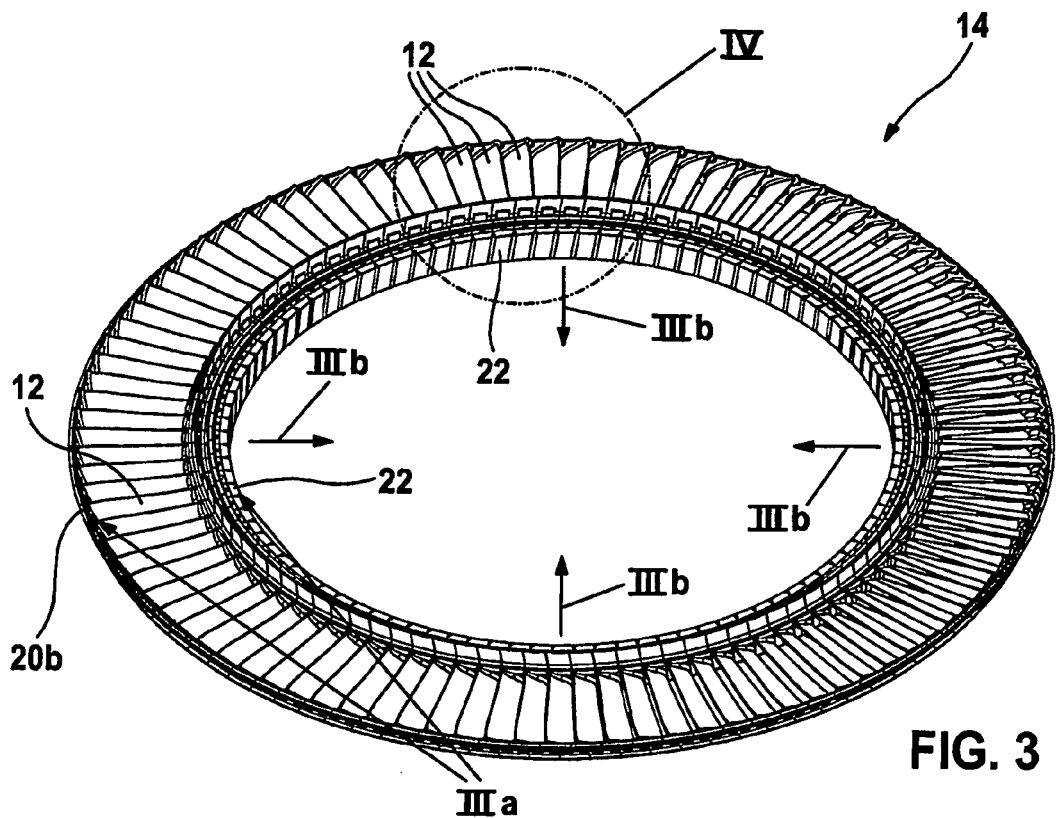
FIG. 3—a schematic perspective view of a blade ring.

FIG. 3 shows a schematic perspective view of the blade ring 14 that is formed by moving a total of 99 rotor blades 12 into their prescribed installation positions. The entire installation diameter of the blade ring 14 can be checked, for example, with a dial gauge and if applicable readjusted, so as to ensure concentricity. Here, arrow IIIa indicates the pre-twist between the adapter 22 and the outer cover strip profile 20b (Z profile) of the rotor blade 12. The desired pre-twist is established as a result of the fact that the rotor blades 12 only shrink in the area of their adapter 22 whereas their outer cover strip profiles 20b do not undergo shrinkage from the welding procedure. This pre-twist can be systematically selected by defining the wedge thickness of the adapter 22, as a result of which the pre-twist established by means of the holding device 10 can be either reduced or completely eliminated. For the sake of illustration, the arrows IIIb indicate a shrinkage of the blade ring 14 of approximately 2 mm. Here, it should be pointed out that it is fundamentally possible to dispense with the above-mentioned holding device 10 or with the establishment of a pre-twist using the holding device 10 since the pre-twist of the rotor blades 12 can also be established exclusively by means of the shrinkage resulting from the welding. This also has the advantage that the production or repair of the rotor can be done more quickly and cheaply since the pre-twist is achieved in all of the rotor blades 12 together, and the rotor blades 12 do not have to be clamped and measured individually. In this context, it can be fundamentally provided that the outer cover strip profile 20b of the rotor blades 12 is configured or adapted in such a way as to appropriately promote the establishment of the pre-twist.

Figure 4:
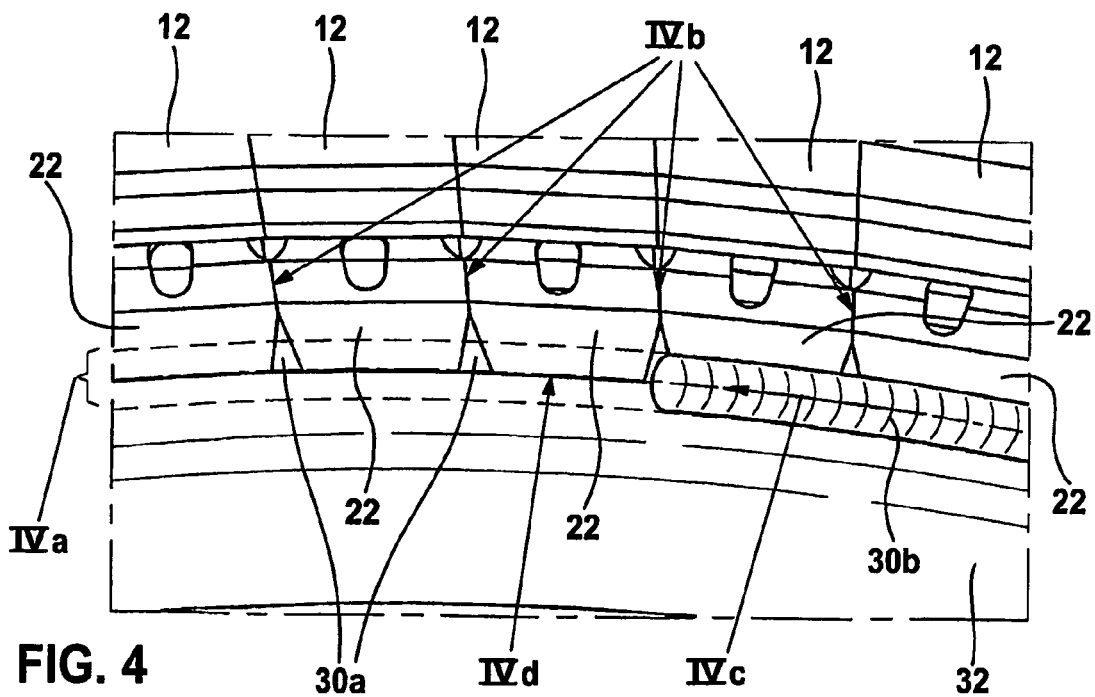
FIG. 4—an enlarged view of the detail IV shown in FIG. 3, depicting several weld seams.

FIG. 4 shows an enlarged view of the detail IV depicted in FIG. 3. Several rotor blades 12 and adapters 22 of the blade ring 14 shown in FIG. 3 can be seen here which are welded by means of an electron-beam welding method that creates several weld seams 30a, 30b. Here, IVa designates an area without impurities stemming from machining, cleaning agent residues and the like. Arrows IVb, in contrast, designate areas that have such impurities and consequently could leave a gap behind. Especially when high-temperature-resistant materials are employed—for example, Inconel 718—for the rotor blades 12 or for the adapters 22, the machining of the blade ring 14 without cooling lubricants (dry) becomes very problematic. This is why the adapters 22 are first tack-welded to each other in that radial weld seams 30a are created that have a depth of at least 60% of the top surface width of the axial weld seam 30b. The radial weld seams 30a are created so as to be uniformly distributed along the inner circumference of the blade ring 14. The welding depth is 5 mm to 6 mm in the present embodiment. Since the welding depth is deeper than necessary, any cooling lubricants that might be present are prevented from penetrating too deeply into the residual gap during the machining. Here, as mentioned above, it can be provided that a larger welding shrinkage is accepted in order to establish a specific pre-twist in the rotor blades 12.

Subsequently, a rotor disk 32 is arranged on the blade ring 14 and welded together with the adapters 22 in order to create a rotor configured as a turbine disk (blisk). For this purpose, the radial weld seams 30a are over-welded as shown by arrow IVc and the axial weld seam 30b is formed. Consequently, in the area marked by the arrow IVd, the axial weld seam 30b—which runs in a circle relative to the rotational axis of the blade ring 14 or of the rotor, and along a contact area between the adapters 22 and the rotor disk 32—does not come into contact with impurities that might be present, as a result of which the formation of pores or flawed sites is ruled out and a suitably high-quality join is achieved. For the welding, an electron-beam welding method is employed, whereby it is also fundamentally possible to employ a laser-beam welding method or the like.

Figure 5:
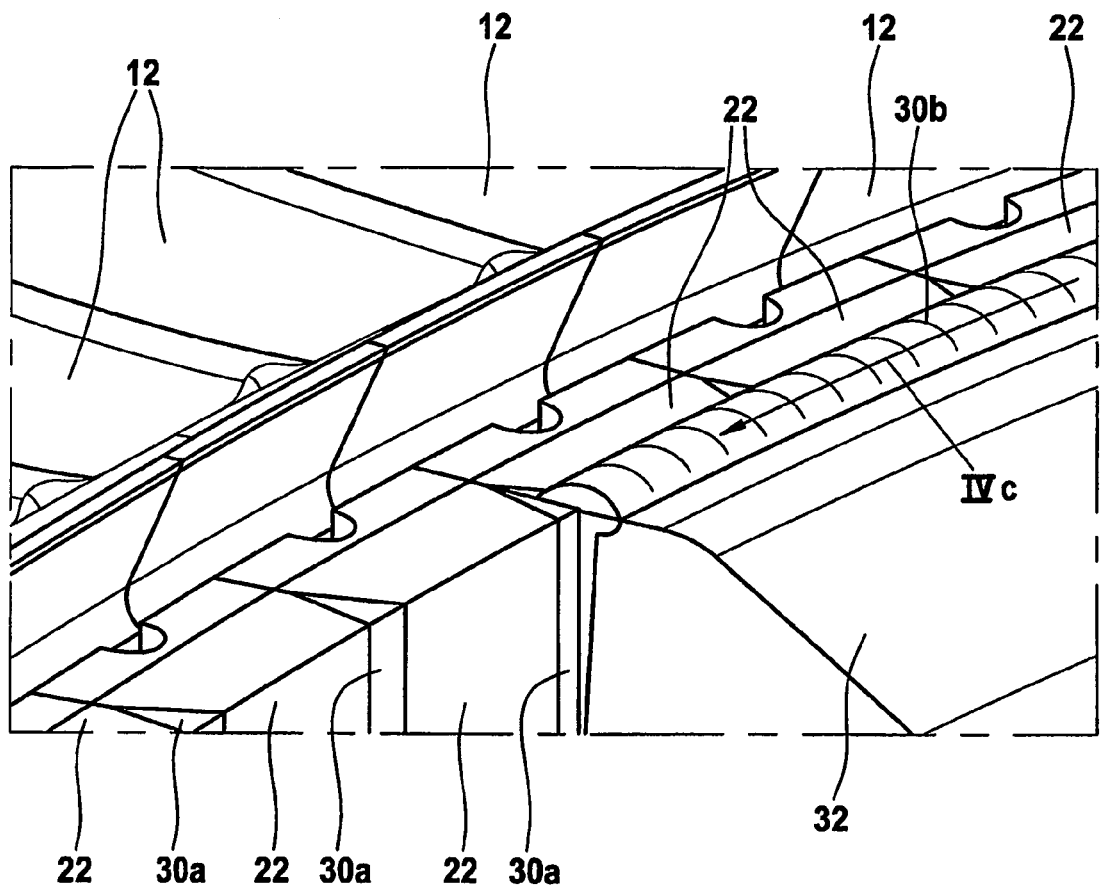
FIG. 5—an enlarged and partial sectional perspective view of the detail IV shown in FIG. 3.

For the sake of better elucidation, FIG. 5 shows an enlarged and partial sectional perspective view of the detail IV depicted in FIG. 3. Here, especially the radial weld seams 30a between the adapters 22 as well as the axial weld seam 30b between the adapters 22 and the rotor disk 32 can be seen. The above-mentioned process steps can be fundamentally employed not only for the production but also for the repair of the blade ring 14 or of the rotor.

The invention claimed is:

1. A method for the production of a rotor comprising the following steps:
producing a blade ring comprising a plurality of rotor blades;
welding together adapters arranged in an area of roots of the rotor blades to create at least essentially radial weld seams having predefined welding depths;
positioning a rotor disk or a rotor ring on the blade ring; and
welding the rotor disk or the rotor ring to the adapters of the rotor blades to create at least one additional weld seam, wherein the rotor disk or the rotor ring is welded to the adapters in such a way that the at least one additional weld seam runs axially and/or circularly relative to the axis of rotation of the rotor and/or along a contact area between the adapters and the rotor disk or the rotor ring, wherein the welding depths of the radial weld seams are selected in such a way that they amount to at least 50% of a top surface width of the at least one additional weld seam and wherein the radial weld seams are over-welded with the at least one additional weld seam.

2. The method as recited in claim 1 wherein the rotor blades are arranged in a prescribed installation position of the blade ring in order to produce the blade ring.

3. The method as recited in claim 2 wherein the rotor blades are first detachably secured to a holding device and arranged in the prescribed installation position of the blade ring by moving the holding device.

4. The method as recited in claim 1 wherein a pre-twist is established in the rotor blades before the blade ring is formed and/or after the radial weld seams are created.

5. The method as recited in claim 4 wherein that the pre-twist is established through shrinkage after the radial weld seams have been created.

6. The method as recited in claim 4 wherein the pre-twist is an angle between 0.5° and 5°.

7. The method as recited in claim 6 wherein the pre-twist is between 1° and 3°.

8. The method as recited in claim 1 wherein the welding depths of the radial weld seams are selected in such a way that they amount to at least 60% of the top surface width of the at least one additional weld seam.

9. The method as recited in claim 1 wherein the radial weld seams are made with welding depths between 3 mm and 10 mm.

10. The method as recited in claim 1 wherein the radial weld seams are made with welding depths between 5 mm and 6 mm.

11. The method as recited in claim 1 wherein the radial weld seams are created so as to be uniformly distributed along an inner circumference of the blade ring.

12. The method as recited in claim 1 wherein electron-beam welding and/or a laser-beam welding is employed for the welding.

13. The method as recited in claim 1 wherein the rotor is a turbine disk or a turbine ring for a turbine stage of a continuous-flow machine.

* * * * *